(12) United States Patent
Ng et al.

(10) Patent No.: US 9,307,521 B2
(45) Date of Patent: Apr. 5, 2016

(54) TRANSMISSION SCHEME AND QUASI CO-LOCATION ASSUMPTION OF ANTENNA PORTS FOR PDSCH OF TRANSMISSION MODE 10 FOR LTE ADVANCED

(71) Applicant: Samsung Electronics Co., LTD, Suwon-si, Gyeonggi-do (KR)

(72) Inventors: Boon Loong Ng, Dallas, TX (US); Younsun Kim, Seongnam-shi (KR); Young-Han Nam, Richardson, TX (US); Hyojin Lee, Seoul (KR); Krishna Sayana, San Jose, CA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 142 days.

(21) Appl. No.: 13/942,186

(22) Filed: Jul. 15, 2013

(65) Prior Publication Data

US 2014/0119266 A1    May 1, 2014

Related U.S. Application Data

(60) Provisional application No. 61/721,335, filed on Nov. 1, 2012.

(51) Int. Cl.
| | |
|---|---|
| *H04W 72/00* | (2009.01) |
| *H04B 7/02* | (2006.01) |
| *H04L 1/00* | (2006.01) |
| *H04L 5/00* | (2006.01) |
| *H04L 27/26* | (2006.01) |

(52) U.S. Cl.
CPC ............. *H04W 72/005* (2013.01); *H04B 7/024* (2013.01); *H04L 1/0026* (2013.01); *H04L 1/0061* (2013.01); *H04L 1/0067* (2013.01); *H04L 5/0053* (2013.01); *H04L 27/2602* (2013.01)

(58) Field of Classification Search
None
See application file for complete search history.

(56) References Cited

U.S. PATENT DOCUMENTS

| 9,014,079 B2* | 4/2015 | Wiberg et al. ................. 370/315 |
| 2002/0131381 A1* | 9/2002 | Kim et al. ..................... 370/335 |
| 2010/0165943 A1* | 7/2010 | Kato et al. ..................... 370/329 |
| 2010/0272035 A1* | 10/2010 | Park et al. ..................... 370/329 |

(Continued)

OTHER PUBLICATIONS

International Search Report dated Feb. 25, 2014 in connection with International Patent Application No. PCT/KR2013/009847, 3 pages.

(Continued)

*Primary Examiner* — Bunjob Jaroenchonwanit

(57) ABSTRACT

Methods and apparatuses determine and indicate QCL behavior for or to a UE. A method for determining QCL behavior for the UE method includes, when configured in TM10 for a serving cell, determining whether a CRC for a PDSCH transmission scheduled by DCI format 1A is scrambled using a C-RNTI. The method also includes, in response to determining C-RNTI scrambling, determining whether a transmission scheme of the PDSCH transmission uses a non-MBSFN subframe configuration and whether the PDSCH transmission is transmitted on antenna port 0 or a TxD scheme is used. The method further includes, in response to determining the non-MBSFN subframe configuration and antenna port 0 or the TxD scheme being used, determining to use QCL behavior 1 for PDSCH reception. Additionally, the method includes, in response to determining a MBSFN subframe configuration and antenna port 7 being used, determining to use QCL behavior 2 for PDSCH reception.

20 Claims, 4 Drawing Sheets

(56) References Cited

U.S. PATENT DOCUMENTS

| | | | |
|---|---|---|---|
| 2010/0279628 A1* | 11/2010 | Love et al. ..................... 455/70 |
| 2011/0070845 A1* | 3/2011 | Chen et al. .................... 455/91 |
| 2011/0081939 A1* | 4/2011 | Damnjanovic et al. ....... 455/522 |
| 2011/0090983 A1* | 4/2011 | Zhang et al. .................. 375/295 |
| 2011/0103291 A1* | 5/2011 | Wiberg et al. ................. 370/315 |
| 2011/0116437 A1* | 5/2011 | Chen et al. .................... 370/312 |
| 2011/0194478 A1* | 8/2011 | Lee et al. ...................... 370/312 |
| 2011/0222501 A1* | 9/2011 | Kim et al. ...................... 370/329 |
| 2011/0223924 A1* | 9/2011 | Lohr et al. ..................... 455/450 |
| 2011/0255483 A1* | 10/2011 | Xu et al. ........................ 370/329 |
| 2012/0195267 A1 | 8/2012 | Dai et al. |
| 2012/0257562 A1* | 10/2012 | Kim et al. ..................... 370/312 |
| 2012/0282936 A1* | 11/2012 | Gao et al. ...................... 455/450 |
| 2013/0176952 A1* | 7/2013 | Shin et al. ..................... 370/329 |
| 2013/0188505 A1* | 7/2013 | Nory et al. .................... 370/252 |
| 2013/0201954 A1* | 8/2013 | Gao et al. ...................... 370/329 |
| 2013/0215823 A1* | 8/2013 | Shin et al. ..................... 370/328 |
| 2013/0223402 A1* | 8/2013 | Feng et al. ..................... 370/330 |
| 2013/0250879 A1* | 9/2013 | Ng et al. ........................ 370/329 |
| 2013/0308572 A1* | 11/2013 | Sayana et al. ................. 370/329 |
| 2013/0329625 A1* | 12/2013 | Lee et al. ....................... 370/312 |
| 2014/0010195 A1* | 1/2014 | Angelow et al. .............. 370/329 |
| 2014/0036806 A1* | 2/2014 | Chen et al. .................... 370/329 |
| 2014/0044061 A1* | 2/2014 | Yue et al. ....................... 370/329 |
| 2014/0050192 A1* | 2/2014 | Kim et al. ...................... 370/329 |
| 2014/0056220 A1* | 2/2014 | Poitau et al. ................... 370/328 |
| 2014/0086173 A1* | 3/2014 | Sadeghi et al. ................ 370/329 |
| 2014/0119266 A1* | 5/2014 | Ng et al. ........................ 370/312 |
| 2014/0133423 A1* | 5/2014 | Froberg Olsson et al. .... 370/329 |
| 2014/0177487 A1* | 6/2014 | Hammarwall et al. ........ 370/280 |
| 2014/0185530 A1* | 7/2014 | Kuchibhotla et al. ......... 370/329 |
| 2014/0192700 A1* | 7/2014 | Lee et al. ....................... 370/312 |
| 2014/0204807 A1* | 7/2014 | Li et al. ......................... 370/277 |
| 2014/0219202 A1* | 8/2014 | Kim et al. ...................... 370/329 |
| 2014/0233481 A1* | 8/2014 | Feng et al. ..................... 370/329 |
| 2014/0241232 A1* | 8/2014 | Damji et al. ................... 370/312 |
| 2014/0254504 A1* | 9/2014 | Bashar et al. .................. 370/329 |
| 2015/0023265 A1* | 1/2015 | Park et al. ...................... 370/329 |

OTHER PUBLICATIONS

3GPP TSG RAN WG1 #70bis; "Remaining issues for antenna ports quasi-collocation"; R1-124071; Oct. 8-12, 2012; San Diego, USA; 5 pages.

3GPP TSG RAN WG1 #70bis; "PDSCH RE mapping and quasi-collocation signaling for CoMP"; R1-124333; Oct. 8-12, 2012; San Diego, USA; 3 pages.

3GPP TSG RAN WG1 #70bis; "Outstanding Issues for Antenna Ports Quasi Co-location"; R1-124520; Oct. 8-12, 2012; San Diego, USA; 9 pages.

3GPP TSG RAN WG1 #70bis; "Downlink control signaling for CoMP"; R1-124194; Oct. 8-12, 2012; San Diego, USA; 6 pages.

* cited by examiner

TRANSMISSION SCHEME AND QUASI CO-LOCATION ASSUMPTION OF ANTENNA PORTS FOR PDSCH OF TRANSMISSION MODE 10 FOR LTE ADVANCED

CROSS-REFERENCE TO RELATED APPLICATION(S) AND CLAIM OF PRIORITY

The present application claims priority to U.S. Provisional Patent Application Ser. No. 61/721,335 filed Nov. 1, 2012, entitled "TRANSMISSION SCHEME AND QUASI CO-LOCATION ASSUMPTION FOR PDSCH OF TRANSMISSION MODE 10 FOR LTE ADVANCED REL-11". The content of the above-identified patent document is incorporated herein by reference.

TECHNICAL FIELD

The present application relates generally to multi-point communication systems and, more specifically, to quasi co-location (QCL) of antenna ports.

BACKGROUND

CoMP technology has been standardized to allow the user equipment (UE) to receive signals from multiple transmission points (TPs) in different usage scenarios. The different scenarios include: 1) a homogeneous network with intra-site CoMP, 2) a homogeneous network with high transmit (Tx) power remote radio heads (RRHs), 3) a heterogeneous network with low-power RRHs within the macro cell coverage where the transmission/reception points created by the RRHs have different cell identifiers (IDs) from the macro cell, and 4) a heterogeneous network with low power RRHs within the macro cell coverage where the transmission/reception points created by the RRHs have the same cell IDs as the macro cell. The CoMP communication schemes that have been identified as the focus for standardization are joint transmission (JT); dynamic point selection (DPS), including dynamic point blanking; and coordinated scheduling/beamforming, including dynamic point blanking. Further description of the CoMP usage scenarios is included in 3GPP TS 36.819, which is expressly incorporated by reference herein.

Accordingly, there is a need for improved techniques in the multi-point communication schemes.

SUMMARY

Embodiments of the present disclosure provide a transmission scheme and quasi co-location (QCL) assumption for physical shared channel downlink (PDSCH) of transmission mode 10 (TM10) for LTE advanced wireless communication systems.

In one embodiment, a method for determining QCL behavior for a UE is provided. The method includes, when configured in TM10 for a serving cell in LTE wireless communication system, determining whether a cyclical redundancy check (CRC) for a PDSCH transmission scheduled by DCI format 1A is scrambled using a cell radio network temporary identifier (C-RNTI). The method also includes, in response to determining C-RNTI scrambling, determining whether a transmission scheme of the PDSCH transmission uses a non-multicast broadcast single frequency network (non-MBSFN) subframe configuration and whether the PDSCH transmission is transmitted on antenna port 0 or a transmit diversity scheme is used. The method further includes, in response to determining the non-MBSFN subframe configuration and antenna port 0 or the transmit diversity scheme being used, determining to use QCL behavior 1. Additionally, the method includes, in response to determining a MBSFN subframe configuration and antenna port 7 being used, determining to use QCL behavior 2.

In another embodiment, an apparatus in a UE capable of determining QCL behavior for the UE is provided. The apparatus includes a receiver configured to receive a PDSCH transmission and a controller. The controller is configured to determine, when configured in TM10 for a serving cell in LTE wireless communication system, whether a CRC for the PDSCH transmission scheduled by DCI format 1A is scrambled using a C-RNTI. The controller is also configured to determine, in response to determining C-RNTI scrambling, whether a transmission scheme of the PDSCH transmission uses a non-MBSFN subframe configuration and whether the PDSCH transmission is transmitted on antenna port 0 or a transmit diversity scheme is used. The controller is also configured to determine, in response to determining the non-MBSFN subframe configuration and antenna port 0 or the transmit diversity scheme being used, to use QCL behavior 1 for PDSCH reception. Additionally, the controller is configured to determine, in response to determining a MBSFN subframe configuration and antenna port 7 being used, to use QCL behavior 2 for PDSCH reception.

In yet another embodiment, an apparatus in a transmission point capable of indicating QCL behavior to a UE is provided. The apparatus includes a transmitter configured to transmit a PDSCH transmission. The transmission point is configured to indicate for UE to use QCL behavior 1 for PDSCH reception when the UE is configured in TM10, a CRC for the PDSCH transmission scheduled by DCI format 1A is scrambled using a C-RNTI, a transmission scheme of the PDSCH transmission uses a non-MBSFN subframe configuration, and the PDSCH transmission is transmitted on antenna port 0 or a transmit diversity scheme is used. The transmission point is configured to indicate for UE to use QCL behavior 2 for PDSCH reception when the UE is configured in TM10, the transmission scheme of the PDSCH transmission scheduled by DCI format 1A uses a MBSFN subframe configuration, and the PDSCH transmission is transmitted on antenna port 7.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
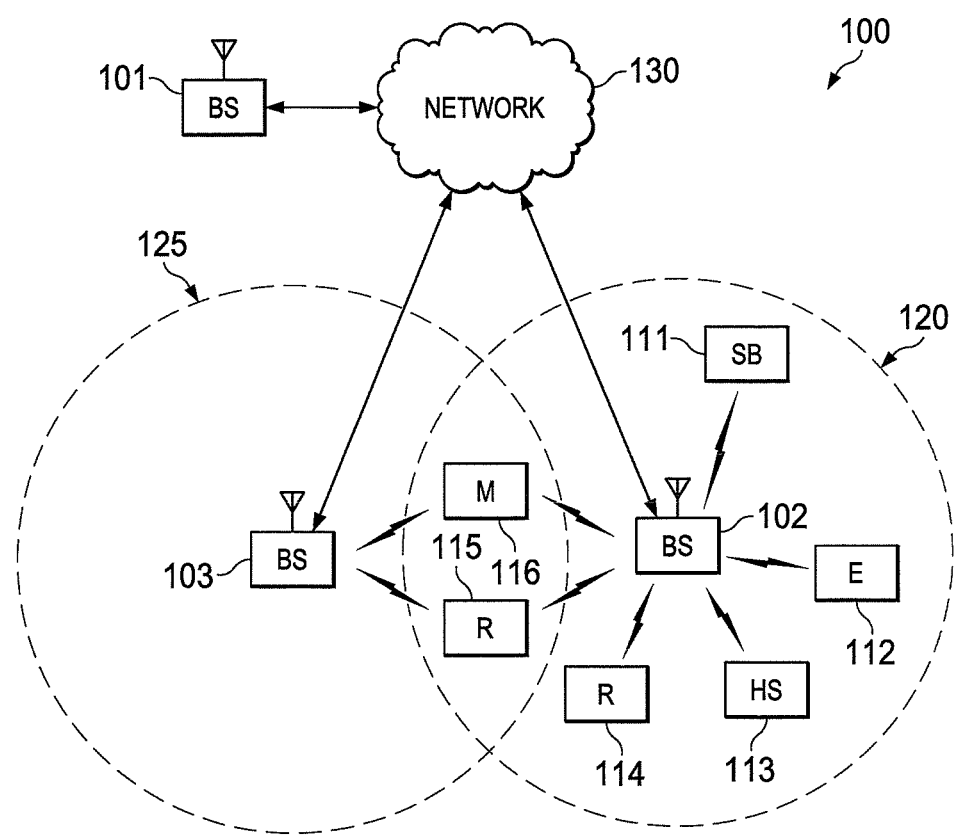
FIG. 1 illustrates an exemplary wireless system which transmits messages in accordance with an illustrative embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standard descriptions are hereby incorporated by reference into the present disclosure as if fully set forth herein: 3GPP TS 36.213 V11.0.0 (2012-09); RP-111365 "Coordinated Multi-Point Operation for LTE WID"; 3GPP TR 36.819 V11.0.0 (2011-09); R1-124669 "RRC Parameters for Downlink CoMP, DL CoMP Rapporteur" by Samsung Electronics, Co.; R1-124020 "LS Response on Antenna Ports Co-Location"; R1-124573 "Way Forward on Fallback Operation for TM10" by LG Electronics, Alcatel-Lucent Shanghai-Bell, MediaTek, Nokia, Nokia Siemens Networks, Qualcomm, and Research In Motion; and R1-124641 "Way Forward on remaining issues of DCI Format 1A in TM10," by Huawei, HiSilicon, Ericsson, and ST-Ericsson. The present application also incorporates by reference U.S. patent application Ser. No. 13/866,804, filed Apr. 19, 2013 and entitled "Quasi Co-Location Identification of Reference Symbol Ports for Coordinated Multi-Point Communication Systems."

Embodiments of the present disclosure recognize that the use of a QCL assumption of antenna ports by a UE can reduce signaling overhead and time used for channel estimation and/or time/frequency synchronization. The QCL of antenna ports is defined as: a port (Port A) is considered to be quasi co-located with another port (Port B) if the UE is allowed to derive the "large scale channel properties" of Port A, (e.g., needed for channel estimation/time-frequency synchronization based on Port A) from measurement on Port B. For example, these large scale channel properties may include one or more of: delay spread, Doppler spread, frequency shift, average received power (may only be needed between ports of the same type), and received timing.

Another definition of QCL of antenna ports is as follows: if two antenna ports are quasi co-located, the UE may assume that large-scale properties of the channel over which a symbol on one antenna port is conveyed can be inferred from the channel over which a symbol on the other antenna port is conveyed. For example, the large-scale properties in the above definition may include one or more of: delay spread, Doppler spread, Doppler shift, average gain, and average delay. For the purpose of definition of quasi co-location channel properties: the term "channel" in the above definition includes all the effects and transformations occurring after the corresponding antenna port as defined in 3GPP TS 36.211, which is expressly incorporated by reference herein, including impairments and non-idealities of the radio equipment from eNB; antenna ports may be assumed to be ideally synchronized in time and frequency; and non-idealities in the RF chain as well as the network's intended control of Tx delay, Tx frequency shift, and Tx power difference of the transmit signal as compared to the nominal value are included in this channel model.

Embodiments of the present disclosure recognize that correctly estimating large scale channel properties may be critical to ensure proper channel estimation and time/frequency synchronization performance. For example, minimum mean squared error (MMSE) based channel estimator may require information, such as the path delay profile estimate (for accurate frequency correlation estimate), Doppler estimate (for accurate time-correlation estimate), noise variance, etc.

Embodiments of the present disclosure recognize that, for LTE Release 10, the transmission scheme of the PDSCH corresponding to the physical downlink control channel (PDCCH) addressed by C-RNTI and SPS-RNTI is shown in 3GPP TS 36.213 V11.2.0 in Tables 7.1.

Embodiments of the present disclosure recognize that, for CoMP support in LTE Release 11, TM10 is introduced. The PDCCH addressed by C-RNTI and SPS-RNTI monitored by the UE when configured in TM10 are of dynamic control information (DCI) format 1A and DCI format 2D. "QCL behavior 1" (e.g., PDSCH antenna ports are quasi co-located with the serving cell's CRS ports, QCL type A behavior) may be adopted as the QCL behavior for TM1 through TM9. For PDSCH scheduled by DCI format 2D in TM10, "QCL behavior 2" (e.g., PDSCH antenna ports are quasi co-located with a configured non-zero power CSI-RS resource, QCL type B behavior) may be adopted as the QCL behavior.

Embodiments of the present disclosure recognize that QCL type A behavior may be defined as the cell-specific reference signal (CRS), the channel state information reference signal (CSI-RS), and PDSCH demodulation reference signal (DMRS) may be assumed as quasi co-located with respect to their large scale channel properties (e.g., Doppler shift, Doppler spread, average gain, average delay, and delay spread). QCL type B behavior may be defined as CRS, CSI-RS, and PDSCH DMRS may not be assumed as quasi co-located with respect to their large scale channel properties (e.g., delay spread, Doppler spread, Doppler shift, average gain, and average delay) with the exception that PDSCH DMRS and a particular CSI-RS resource indicated by physical layer signaling may be assumed as quasi co-located with respect to their large scale channel properties (e.g., delay spread, Doppler spread, Doppler shift, average gain, and average delay).

To realize Behavior B for DCI format 2D, up to four sets of PDSCH RE mapping and quasi-co-location parameters may be configured using radio resource control (RRC) signaling and indicated by DCI format 2D. Each set that can be signaled in DCI format 2D for TM10 corresponds to a higher-layer list of the parameters listed in Table 1 below. Table 1 illustrates a set of PDSCH RE mapping and QCL parameters indicated by each code point in DCI format 2D.

TABLE 1

| | |
|---|---|
| $n_{CRS}$ | Number of CRS ports.<br>Integer value of either 1, 2, or 4, and a reserved value that has no Rel-11 UE behavior attached to it.<br>Default value is the number of CRS ports of the serving cell |
| $v_{shift}$ | Position in the frequency domain for CRS.<br>Integer value in the range of [0, 5].<br>Default value in case RAN2 decides to specify: position in the frequency domain for the CRS of the serving cell |
| MBSFN subframe configuration | MBSFN subframe configuration<br>Default value is the MBSFN configuration of the serving cell |
| PDSCH-Start-Sym | PDSCH starting symbol.<br>One value in the set {reserved value 1, 2, 3, 4 (4 is applicable only for system BW of <=10PRBs), value indicated by PCFICH of serving cell in case of non-cross-carrier scheduling or higher-layer configured value in case of cross-carrier scheduling}.<br>Default value is the starting position of PDSCH indicated by PCFICH of the serving cell in case of non-cross-scheduling or higher-layer configured value in case of cross-carrier scheduling |
| zeroTxPowerCSI-RS | A ZP CSI-RS configuration assumed by the UE for PDSCH rate matching and RE mapping, which is determined by a zeroTxPowerResourceConfigList and a zeroTxPowerSubframeConfig.<br>Default value is the ZP CSI-RS configuration which the UE assumes for PDSCH rate matching and RE mapping when scheduled with the fallback DCI format 1A in TM10 |
| QuasiCoLocation-Index | One non-zero power CSI-RS resource index for indication of quasi-colocation assumption on DMRS. |

Embodiments of the present disclosure also recognize that, for the rate matching assumption for the PDSCH scheduled by DCI format 1A, one zero power (ZP) CSI-RS configuration may be identified by higher layer signaling as the ZP-CSI-RS configuration that the UE assumes for PDSCH rate matching and RE mapping when scheduled with the fallback DCI format 1A in TM10. If only one ZP CSI-RS configuration is configured for the UE, the UE assumes for PDSCH rate matching and RE mapping when scheduled with the fallback DCI format 1A in TM10.

Figure 6:
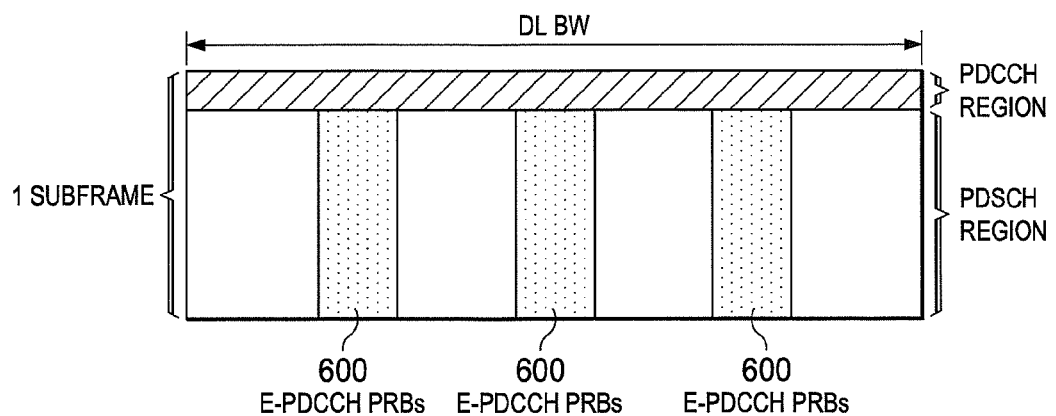
FIG. 6 illustrates a subframe configuration including E-PDCCH PRBs in the PDSCH region in accordance with various embodiments of the present disclosure.

Embodiments of the present disclosure also recognize that, for Release 11, enhanced PDCCH (E-PDCCH) is introduced for increasing DL control capacity within a cell and for mitigating inter-cell interference for DL control. E-PDCCH physical resource blocks (PRBs) 600 are placed in the PDSCH region as illustrated in FIG. 6, and the E-PDCCH PRBs convey DL control signaling to Release 11 UEs configured to receive E-PDCCH.

For UE-specific search space on E-PDCCH, each UE can be configured with K (e.g., 1≤K≤2) E-PDCCH sets (e.g., as described in 3GPP TS 36.213§9.1.4). An E-PDCCH set is defined as a group of N PRB pairs. The RRC configuration for each E-PDCCH set consists of the following information: 1) a group of N PRB pairs, to indicate which N PRB pairs are used for the E-PDCCH set where: N={2, 4, 8} and N=8 is not supported when system bandwidth is <8 PRBs, the K sets do not have to all have the same value of N, and the PRB pairs in different E-PDCCH sets can be fully overlapped, partially overlapped, or non-overlapping; 2) type of the E-PDCCH set (e.g., distributed or localized), as described in 3GPP TS 36.213§9.1.4), KL and KD may include following combinations: {KL=1, KD=0}, KL=0, KD=11, KL=1, KD=11, KL=0, KD=21, KL=2, KD=01, where KL is the number of localized E-PDCCH sets and KD is the number of distributed E-PDCCH sets; 3) the DMRS scrambling sequence initialization parameter $n_{ID}^{EPDCCH}$ (e.g., as described in 3GPP TS 36.211§6.10.3A.1) has an integer value range (e.g., 0 . . . 503) and a recommended default value for the second set as the same value for the first set in order to save the signaling overhead; and 4) the PUCCH resource starting offset for the E-PDCCH set (e.g., as described in 3GPP TS 36.213§10.1) has a value range that is integer (e.g., 0 . . . 2047).

For the subframes where UE monitors UE-specific search space on E-PDCCH, the configuration by higher layer signaling may be provided to indicate the subframes in which the UE monitors or does not monitor the UE-specific search space on E-PDCCH (e.g., as described in 3GPP TS 36.213§9.1.4). In subframes not configured for monitoring E-PDCCH, the UE monitors the common search space (CSS) and the UE-specific search space (USS or UESS) on the PDCCH according to Release 10 behavior. A motivation for introducing this signaling includes physical multicast channel (PMCH) subframe handling, enhanced inter-cell interference coordination (eICIC), and possibly other cases to improve the reliability of downlink control channels. The higher layer signaling consists of a new bitmap that has the same periodicity and size as those used for eICIC. If the new bitmap is not provided, the default is that, if E-PDCCH is configured, the UE monitors USS on E-PDCCH in all subframes, except that in a special subframe with special subframe configuration 0 or 5 in normal CP, special subframe configuration 0, 4, or 7 in extended CP, or if the UE is aware that a subframe contains PMCH, the UE monitors USS on PDCCH.

For E-PDCCH starting symbol configuration, if the UE is not configured in TM10, higher layer signaling can be transmitted to indicate the OFDM starting symbol for any E-PDCCH on that cell, and the PDSCH on that cell scheduled by E-PDCCH. The value range is {1, 2, 3, 4}, where the values 1, 2, and 3 are applicable when the bandwidth of the cell is greater than 10 resource blocks, and the values 2, 3, 4 are applicable when the bandwidth of the cell is less than or equal to 10 resource blocks. If this signaling is not provided, the starting OFDM symbol of E-PDCCH and PDSCH scheduled by E-PDCCH is derived from PCFICH. A single value of OFDM starting symbol is applicable to both E-PDCCH sets (if two sets are configured).

For Quasi-colocation configuration for E-PDCCH DMRS, if the UE is configured in TM10, higher layer signaling, QCL-CSI-RS-Index, may be transmitted to indicate the QCL assumption for E-PDCCH DMRS. QCL-CSI-RS-Index is configured per E-PDCCH set (e.g., Behavior B1, defined as follows: E-PDCCH DMRS ports shall not be assumed as quasi co-located with any RS port, with the following exceptions: within each distributed E-PDCCH set or each localized E-PDCCH set, all E-PDCCH DMRS ports may be assumed as quasi co-located with respect to their large scale channel properties (e.g., delay spread, Doppler spread, Doppler shift, average gain and average delay) with a configurable NZP CSI-RS resource). When the signaling is provided, E-PDCCH DMRS ports are not assumed as quasi co-located with any RS port, with the exception that all E-PDCCH DMRS ports within the E-PDCCH set may be assumed as quasi co-located with respect to their large scale channel properties (e.g., delay spread, Doppler spread, Doppler shift, average gain and average delay) with the non-zero power (NZP) CSI-RS resource indicated by QCL-CSI-RS-Index. All NZP-CSI-RS resources used for QCL assumptions are NZP-CSI-RS resources that are configured in the CoMP measurement set. If this signaling is not provided, all E-PDCCH DMRS ports may be assumed as quasi co-located with respect to their large scale channel properties (e.g., delay spread, Doppler spread, Doppler shift, average gain and average delay) with CRS for the serving cell (e.g., Behavior A). The E-PDCCH can also be configured for TM1-9 and the E-PDCCH DMRS QCL behavior for TM1-9 is Behavior A.

Accordingly, embodiments of the present disclosure provide details of transmission scheme and QCL assumption for PDSCH scheduled by DCI format 1A of TM10.

For DCI format 2D, four sets of PDSCH RE mapping and quasi-co-location parameters (PQ parameters) are configured by UE specific RRC signaling and DCI format 2D indicates one of the parameters for a UE to decide what to assume when receiving PDSCH using the PDCCH/E-PDCCH. Table 2 lists four such states for PDSCH RE mapping and quasi co-location parameters.

TABLE 2

| States | UE's assumption of PDSCH RE mapping | NZP CSI-RS for quasi co-location assumption |
|---|---|---|
| 1 | First PDSCH RE mapping configured by higher layers | First NZP CSI-RS configured by higher layers |
| 2 | Second PDSCH RE mapping configured by higher layers | Second NZP CSI-RS configured by higher layers |
| 3 | Third PDSCH RE mapping configured by higher layers | Third NZP CSI-RS configured by higher layers |
| 4 | Fourth PDSCH RE mapping configured by higher layers | Fourth NZP CSI-RS configured by higher layers |

Additionally, for DCI signaling in Format 2D, a new bit may be added to the contents of DCI format 2C to form the DCI format for TM10. This new bit, together with $n_{SCID}$, dynamically selects the PDSCH RE mapping and quasi-co-location parameter sets among the four parameter sets configured by higher layers. Two new bits may also be added to the contents of DCI format 2C to form the DCI format for TM10.

Accordingly, embodiments of the present disclosure provide details of PDSCH RE mapping QCL assumption for PDSCH scheduled by DCI format 2D of TM10.

Figure 2:
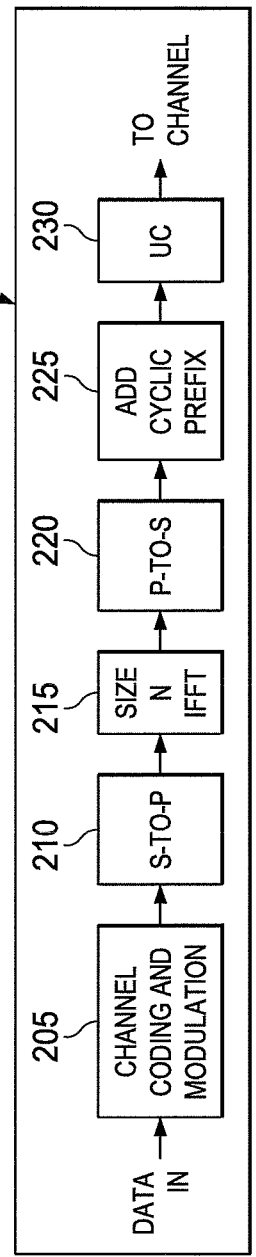
FIG. 2 illustrates a high-level diagram of an orthogonal frequency division multiple access transmit path in accordance with an illustrative embodiment of the present disclosure.
Figure 3:
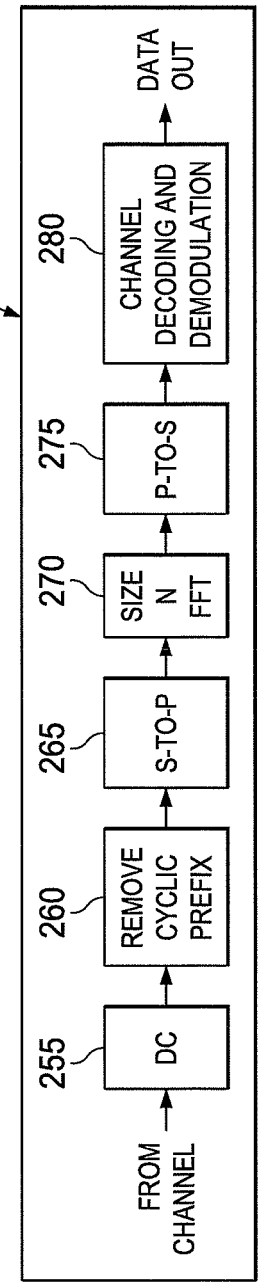
FIG. 3 illustrates a high-level diagram of an orthogonal frequency division multiple access receive path in accordance with an illustrative embodiment of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with network 130 or a similar IP-based system (not shown).

Base station 102 provides wireless broadband access (via base station 101) to network 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Base station 103 provides wireless broadband access (via base station 101) to network 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via network 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a UE (e.g., UE 116 of FIG. 1). In other examples, for uplink communication, the receive path circuitry 300 may be implemented in a base station (e.g., base station 102 of FIG. 1) or a relay station, and the transmit path circuitry 200 may be implemented in a UE (e.g., UE 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (EFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Figure 4:
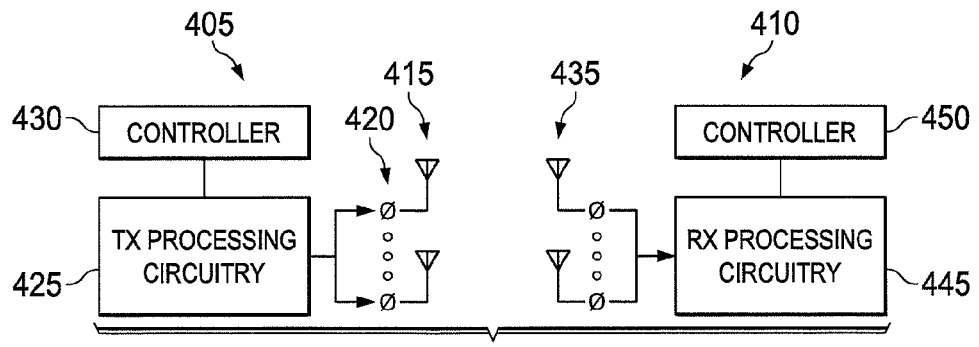
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that may be used to implement various embodiments of the present disclosure. In this illustrative example, the transmitter 405 and the receiver 410 are devices at a communication point in a wireless communication system, such as, for example, wireless system 100 in FIG. 1. In some embodiments, the transmitter 405 or the receiver 410 may be a network entity, such as a base station, e.g., an evolved node B (eNB), a remote-radio head, a relay station, an underlay base station; a gateway (GW); or a base station controller (BSC). In other embodiments, the transmitter 405 or the receiver 410 may be a UE (e.g., mobile station, subscriber station, etc.). In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, Tx processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the Tx processing circuitry 425 may implement a transmit path that is analogous to the transmit processing circuitry 200 in FIG. 2. Transmitter 405 may also perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435 an incoming RF signal or signals transmitted by one or more transmission points, such as base stations, relay stations, remote radio heads, UEs, etc. Receiver 410 includes Rx processing circuitry 445 that processes the received signal(s) to identify the information transmitted by the transmission point(s). For example, the Rx processing circuitry 445 may down-convert the incoming RF signal(s) to produce an intermediate frequency (IF) or a baseband signal by channel estimating, demodulating, stream separating, filtering, decoding, and/or digitizing the received signal(s). For example, the Rx processing circuitry 445 may implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

In various embodiments, the transmitter 405 is located within a TP, and the receiver is located within a UE in a CoMP communication system. For example, in the CoMP communication, multiple TPs may include transmitters similar to the transmitter 405 that transmits to the UE. The multiple TPs may be any combination of base stations (e.g., eNB, macro base stations, etc.), RRHs, and/or underlay base stations (e.g., micro base stations, relay stations, etc.).

The illustration of transmitter 405 and receiver 410 illustrated in FIG. 4 is for the purposes of illustrating one embodiment in which embodiments of the present disclosure may be implemented. Other embodiments of the transmitter 405 and the receiver 410 may be used without departing from the scope of this disclosure. For example, the transmitter 405 may be located in a communication node (e.g., BS, UE, RS, and RRH) that also includes a receiver, such as receiver 410. Similarly, the receiver 410 may be located in a communication node (e.g., BS, UE, RS, and RRH) that also includes a transmitter, such as transmitter 405. Antennas in the Tx and Rx antenna arrays in this communication node may overlap or be the same antenna arrays used for transmission and reception via one or more antenna switching mechanisms.

Figure 5:
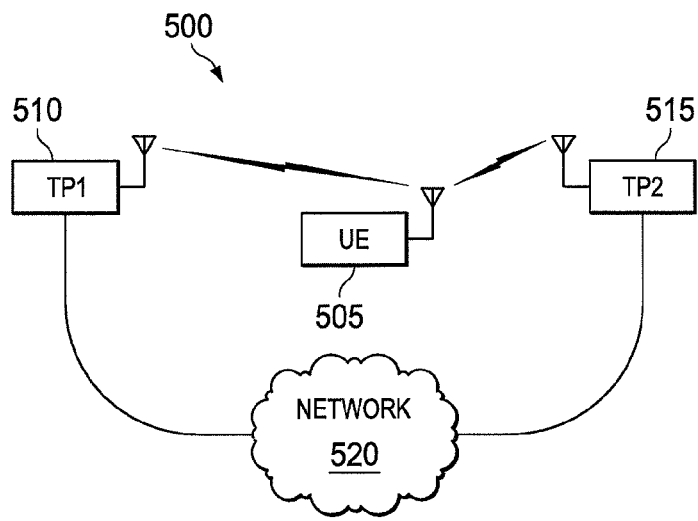
FIG. 5 illustrates a block diagram of a multi-point communication system in accordance with various embodiments of the present disclosure.

FIG. 5 illustrates a block diagram of a multi-point communication system 500 in accordance with various embodiments of the present disclosure. In this illustrative example, the CoMP communication system 500 includes a UE 505 and two TPs 510 and 515. For example, the UE 505 may include a receiver and transmitter as illustrated in FIG. 4. The TPs 510 and 515 may also include a receiver and transmitter as illustrated in FIG. 4. The TPs 510 and 515 may be any combination of base stations (e.g., eNB, macro base stations, etc.), RRHs, and/or underlay base stations (e.g., micro base stations, relay stations, etc.). Additionally, other TPs and UEs may be present in the CoMP communication system 500. For example, more than two TPs may communicate with the same UE 505.

The TPs 510 and 515 are connected to a network 520. For example, the TPs 510 and 515 may be connected by a wire line and/or fiber optical network. The network 520 provides connections between the TPs 510 and 515 to provide data and control information for wireless communication between the TPs 510 and 515 and the UE 505. The network 520 performs scheduling for wireless communications in the multi-point communication system 500. For example, the network 520 may include one or more gateways; or base station controllers. In one example, the network 520 may be one embodiment of the network 130 in FIG. 1.

Embodiments of the present disclosure recognize that reuse of the behavior for DCI format 1A of TM9 for that of TM10 may be advantageous. As the DCI 1A PDSCH is assumed quasi co-located with the serving cell CRS, the PDSCH may be transmitted from all TPs that transmit CRS. One implication is that for CoMP scenario 4, the DCI 1A PDSCHs for each UE have to be transmitted on orthogonal resources. In other words, it may be difficult to obtain area splitting gain for CoMP scenario 4 with DCI format 1A although it is still possible with DCI format 2D. This limits the potential capacity of PDSCH. As a result, embodiments of the present disclosure recognize that reusing the transmission scheme of the DCI format 1A from TM9 and QCL assumption for TM10 may result in loss of area splitting gain for PDSCH scheduled by DCI format 1A in CoMP scenario 4.

On the other hand, embodiments of the present disclosure recognize that allowing DCI 1A PDSCH to only be quasi co-located with a local TP's CSI-RS resources provides area splitting gain in the case of CoMP scenario 4 for DCI 1A PDSCH. Also, using a transmit diversity (TxD) or port 0 transmission scheme may only be supported in the CSS of PDCCH. When a UE being reconfigured by RRC from one of TM1-9 to TM10 or vice versa, the network may only communicate with the UE using DCI format 1A in the CSS of PDCCH, since the network may not be certain which transmission scheme and QCL behavior the UE would assume if the DCI format 1A is transmitted in the USS of the PDCCH. If the UE is being reconfigured to TM10, and the previous configuration is one of TM1-8, the network also cannot transmit DCI format 1A on the CSS of MBSFN subframes. Therefore, in the worst case scenario, this limits the PDCCH region available for fallback transmission scheduling to only the CSS of the normal subframes. This can result in overloading of the CSS, especially since the aggregation level of 4 or 8 is to be used for CSS even though smaller aggregation levels of 1 or 2 is likely to be sufficient as the UE is close to a local TP.

As a result, embodiments of the present disclosure recognize that using only the CSS of the PDCCH for scheduling fallback transmission as proposed can result in overloading of CSS. In the worst case, only the CSS of the normal subframes may be available to the network for scheduling the fallback transmission. Therefore, embodiments of the present disclosure recognize that it is important not to limit the scheduling opportunity of fallback transmission.

Accordingly, in various embodiments, one way to obtain area splitting gain for DCI 1A PDSCH and at the same time not restricting the fallback transmission scheduling is as shown in Table 3 below, which is for PDSCH scheduled by PDCCH with CRC scrambled by C-RNTI with DCI format 1A. Generally, the MBSFN subframes are used to achieve the area splitting gain for DCI format 1A for TM10 in CoMP scenario 4, while the normal subframes (e.g., non-MBSFN subframes) are still reserved for fallback transmission as in Release 8/9/10. These embodiments provide for the fallback scheduling flexibility of DCI format 1A to be maintained and achieve an area splitting gain DCI 1A PDSCH for CoMP scenario 4.

TABLE 3

| Case | Location of DCI format 1A | Transmission scheme for the corresponding PDSCH | Quasi co-location assumption for the corresponding PDSCH | Comment |
| --- | --- | --- | --- | --- |
| 1 | PDCCH (CSS and USS) or E-PDCCH (USS) in Normal subframe | Port 0 or TxD | CRS of the serving cell | Fallback |
| 2 | PDCCH (CSS and USS) or E-PDCCH (USS) in MBSFN subframe | Port 7 | Higher layer configured NZP CSI-RS resource | Area splitting gain can be obtained for DCI format 1A |

In Table 3, the case 1 corresponds to the QCL behavior 1, and the case 2 corresponds to the QCL behavior 2. In one embodiment, the higher layer configured NZP CSI-RS resource in Table 3 is predetermined to be the NZP CSI-RS resource with the lowest index value. In another embodiment, the higher layer configured NZP CSI-RS resource in Table 3 is predetermined to be the first NZP CSI-RS resource in Table 2. This arrangement saves RRC signaling overhead.

Various embodiments recognize that no support for fallback transmission has been present in previous releases for PDSCH corresponding to PDCCH with CRC scrambled by SPS C-RNTI with DCI format 1A, because the transmission scheme is dependent on the transmission mode configured. Accordingly, in various embodiments of the present disclosure, for TM10, the transmission scheme for PDSCH scheduled by DCI format 1A remains as Port 7 transmission scheme as in TM9, but port 7 is assumed quasi co-located with a higher layer configured NZP CSI-RS resource as illustrated in Table 4 below. In this manner, area splitting gain can also be obtained for SPS transmission in CoMP scenario 4. In one exemplary embodiment, the higher layer configured NZP CSI-RS resource in Table 4 can be the same as that applicable for PDCCH with CRC scrambled by C-RNTI with DCI format 1A (e.g., as in Table 3 above). In another example, to allow for more network flexibility, the higher layer configured NZP CSI-RS resource referred to in Table 4 can be different than that applicable for PDCCH with CRC scrambled by C-RNTI with DCI format 1A. In yet another example, the higher layer configured NZP CSI-RS resource. Table 5 illustrates a transmission scheme and QCL behavior for DCI format 1A in TM10 where the CRC is scrambled by C-RNTI.

TABLE 5

| Case | Location of DCI format 1A | Transmission scheme for the corresponding PDSCH | Quasi co-location assumption for the corresponding PDSCH | Comment |
|---|---|---|---|---|
| 1 | PDCCH (CSS and USS) in Normal subframe | Port 0 or TxD | CRS of the serving cell | Fallback |
| 2 | PDCCH (CSS and USS) in MBSFN subframe | Port 7 | Higher layer configured NZP CSI-RS resource* | CoMP support for PDSCH scheduled by DCI format 1A. Area splitting gain can be obtained for DCI format 1A |
| 3 | E-PDCCH (USS) in Normal subframe with Behavior A configured for E-PDCCH DMRS QCL | Port 0 or TxD | CRS of the serving cell | Fallback if reconfiguration of E-PDCCH DMRS QCL behavior is not involved in RRC reconfiguration (e.g. of TM) |
| 4 | E-PDCCH (USS) in MBSFN subframe with Behavior A configured for E-PDCCH DMRS QCL | Port 7 | Higher layer configured NZP CSI-RS resource* | CoMP support for PDSCH scheduled by DCI format 1A. Area splitting gain can be obtained for DCI format 1A |
| 5 | E-PDCCH (USS) with Behavior B1 configured for E-PDCCH DMRS QCL (in Normal or MBSFN subframe) | Port 7 | Higher layer configured NZP CSI-RS resource* | CoMP support for PDSCH scheduled by DCI format 1A. Area splitting gain can be obtained for DCI format 1A |

*Typically, the same higher layer configured CSI-RS resource for all cases. It is also possible to configure separate higher-layer configured NZP CSI-RS resource (e.g., for E-PDCCH and PDCCH).

higher layer configured CSI-RS resource in Table 4 is predetermined to be the NZP CSI-RS resource with the lowest index value, or the first NZP CSI-RS resource in Table 2. This arrangement also saves RRC signaling overhead. Table 4 below illustrates a transmission scheme and QCL behavior (i.e., QCL behavior 2) for DCI format 1A in TM10 where the CRC is scrambled by SPS C-RNTI.

TABLE 4

| Case | Location of DCI format 1A | Transmission scheme for the corresponding PDSCH | Quasi co-location assumption for the corresponding PDSCH | Comment |
|---|---|---|---|---|
| 1 | PDCCH (CSS and USS) or E-PDCCH (USS) in Normal subframe or in MBSFN subframe | Port 7 | Higher layer configured NZP CSI-RS resource | Area splitting gain can be obtained for DCI format 1A |

Various embodiments provide yet another way to obtain area splitting gain for DCI 1A PDSCH and at the same time not restrict the fallback transmission scheduling. One example of such a configuration is illustrated in Table 5. In this illustrative embodiment, if Behavior B1 is configured for E-PDCCH DMRS QCL and a PDSCH is scheduled with DCI format 1A by E-PDCCH, it is assumed that the corresponding PDSCH transmission scheme is port 7 with QCL with a In one embodiment, the higher layer configured NZP CSI-RS resource in Table 5 is predetermined to be the CSI-RS resource with the lowest index value, or the first NZP CSI-RS resource in Table 2, which saves RRC signaling overhead.

Various embodiments recognize that the maximum number of CSI processes (or TPs) (e.g., 1, 3, 4) may be a UE capability for TM10-capable UEs. When the UE is capable of only one CSI process, dynamic point selection (DPS) cannot be supported. In this case, it is sufficient to configure only one set of PQ parameters for DCI format 2D. To achieve additional overhead savings for DCI format 2D, the new bit(s) (e.g., one or two new bits called, for example, PQ bit(s)) is/are not present if the UE is capable of only one CSI process. Similar overhead savings can also be achieved for a UE capable of multiple CSI processes but that is only configured with one CSI process. As an alternative to removing the PQ bit(s), the PQ bit(s) may still be present in the DCI format 2D even if the number of CSI processes is 1, but the PQ bit(s) are considered reserved bits.

When the number of CSI processes is 1, the RRC only configures one set of PQ parameters, and the UE assumes the PDSCH RE mapping and QCL behavior according to the configured PQ parameters when receiving PDSCH scheduled by DCI format 2D. For example, if $n_{SCID}$ and a single PQ bit is used to determine the set of PQ parameters to assume for the case where there are multiple CSI processes configured (e.g., as illustrated in Table 6 below), when there is only one CSI process configured and if there is only one PQ parameter configured by the network, the UE behavior is illustrated in Table 7 below.

TABLE 6

| $n_{SCID}$ | new bit (PQ bit) | PQ parameter |
|---|---|---|
| 0 | 0 | PQ parameter 1 for TP 1 |
| 0 | 1 | PQ parameter 2 for TP 2 |
| 1 | 0 | PQ parameter 3 for TP 3 |
| 1 | 1 | Available for scheduling flexibility (PQ parameter 4 for TP 2) |

TABLE 7

| $n_{SCID}$ | new bit(s) (PQ bits) | PQ parameter |
|---|---|---|
| 0 | Not available | PQ parameter 1 for TP 1 |
| 1 | Not available | PQ parameter 1 for TP 1 |

When the number of CSI processes is 1, but if the RRC is allowed to configure multiple sets of PQ parameters, the UE assumes that only the first set of PQ parameters is applicable. Additionally, the presence of the PQ bit(s) is illustrated in Table 8 below.

TABLE 8

| TM 10 | DCI format 2D without PQ bit(s) (or DCI format 2C) | [1 CSI process configured] or [UE capability of 1 CSI process] |
| | DCI format 2D with PQ bit(s) | [>1 CSI process] or [UE capability of >1 CSI process] |
| | DCI format 1A | Fallback/port 7 |

In various embodiments, the presence of the PQ bit(s) may depend on the number of states for PDSCH RE mapping and QCL parameters configured by RRC and may not depend on the number of CSI processes configured. Multiple examples of such embodiments are illustrated in Tables 9-12. Tables 9 and 10 illustrate examples where $n_{SCID}$ is reused for PQ indication, and Tables 11 and 12 illustrate examples where 2 new bits are introduced for PQ indication.

For Tables 10 and 12, the new PQ bit(s) are present as long as the number of sets of the PQ parameters is greater than 1, with another example illustrated in Table 13 below. The UE behavior may be as illustrated in Table 7 above.

TABLE 9

| # states for PDSCH RE mapping and quasi co-location parameters configured by RRC | The number of new bit(s) (PQ bits) if $n_{SCID}$ reused for PQ indication |
|---|---|
| 1 | 0 |
| 2 | 0 |
| 3 | 1 |
| 4 | 1 |

TABLE 10

| # states for PDSCH RE mapping and quasi co-location parameters configured by RRC | The number of new bit(s) (PQ bits) if $n_{SCID}$ reused for PQ indication |
|---|---|
| 1 | 0 |
| 2 | 1 |
| 3 | 1 |
| 4 | 1 |

TABLE 11

| # states for PDSCH RE mapping and quasi co-location parameters configured by RRC | The number of new bit(s) (PQ bits) if $n_{SCID}$ not reused for PQ indication |
|---|---|
| 1 | 0 |
| 2 | 1 |
| 3 | 2 |
| 4 | 2 |

TABLE 12

| # states for PDSCH RE mapping and quasi co-location parameters configured by RRC | The number of new bit(s) (PQ bits) if $n_{SCID}$ not reused for PQ indication |
|---|---|
| 1 | 0 |
| 2 | 2 |
| 3 | 2 |
| 4 | 2 |

Table 13 illustrates the presence of PQ bit(s) in DCI format 2D.

TABLE 13

| TM 10 | DCI format 2D without PQ bit(s) (or DCI format 2C) | # states for PDSCH RE mapping and quasi co-location parameters configured by RRC is 1 |
| | DCI format 2D with PQ bit(s) | # states for PDSCH RE mapping and quasi co-location parameters configured by RRC is >1 |
| | DCI format 1A | Fallback/port 7 |

In various embodiments, the presence or the number of PQ bit(s) for the embodiments where 2 CSI processes are configured may also depend on whether the number of CRS ports, the CRS frequency shift, the MBSFN subframe configuration, a PDSCH start symbol (which is assumed optional PQ parameters) have been configured by RRC is illustrated in Table 14 below. The number of CRS ports (#CRS ports), the CRS frequency shift, the MBSFN subframe configuration, and the PDSCH start symbol are assumed optional PQ parameters, because they are applicable for CoMP scenario 1, 2, 3 and not applicable for CoMP scenario 4. When they are absent, CoMP scenario 4 is implied and the number of states for PDSCH RE mapping and QCL can be reduced. Table 14 illustrates the presence of PQ bit(s) in DCI format 2D.

TABLE 14

| TM 10 | DCI format 2D without PQ bit(s) (or DCI format 2C) | [1 CSI process] or [2 CSI process without only NZP CSI-RS and/or ZP CSI-RS configured as the PQ parameters] |
| | DCI format 2D with PQ bit(s) | [2 CSI process with #CRS ports, CRS frequency shift, MBSFN subframe configuration, PDSCH start symbol, NZP CSI-RS and ZP CSI-RS configured as the PQ parameters] or [3 or 4 CSI processes] |
| | DCI format 1A | Fallback/port 7 |

Figure 7:
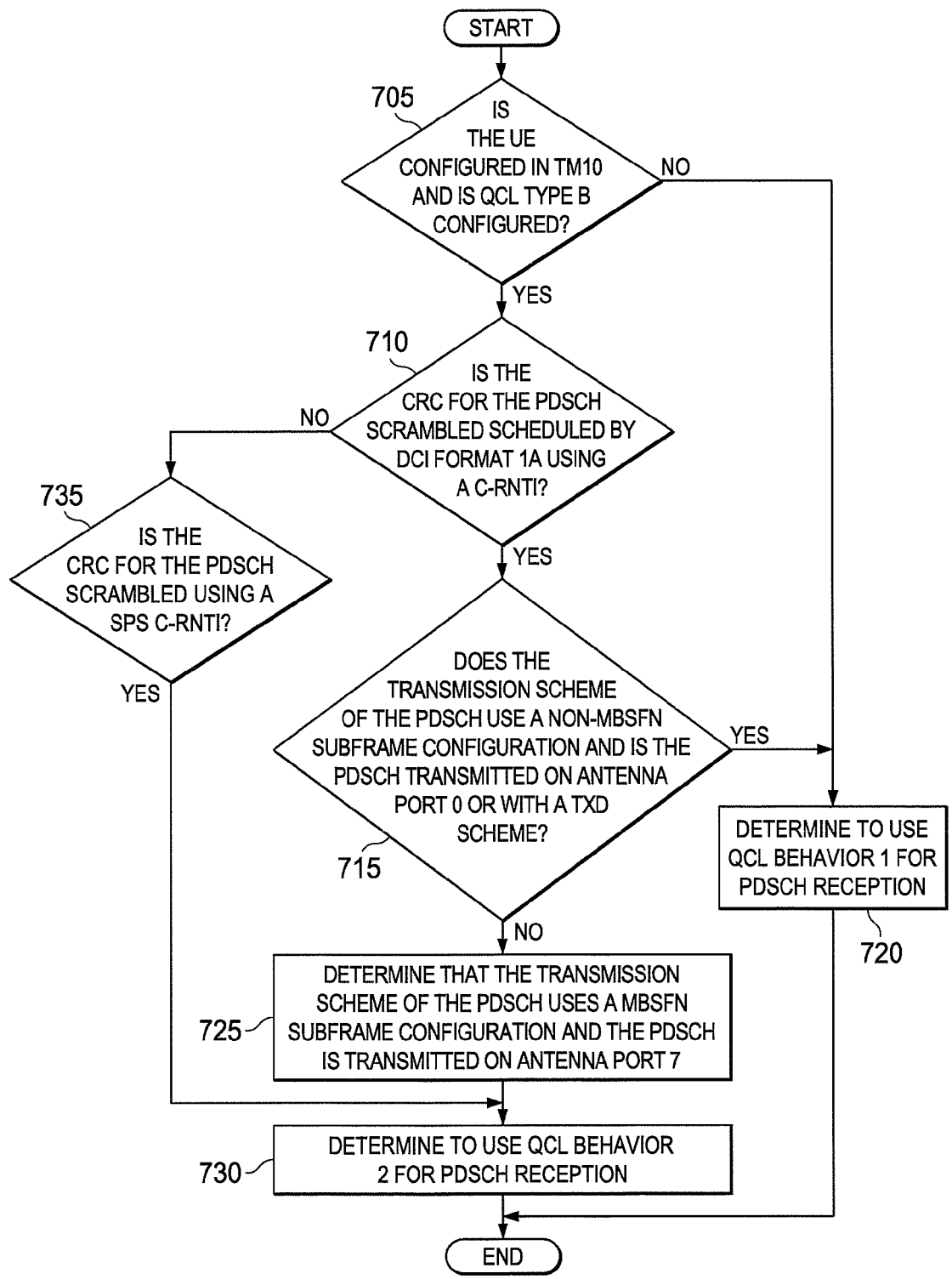
FIG. 7 illustrates a process for determining QCL behavior for a UE in accordance with various embodiments of the present disclosure.

FIG. 7 illustrates a process for determining QCL behavior for a UE in accordance with various embodiments of the present disclosure. For example, the process depicted in FIG. 7 may be performed by the receiver 410 in FIG. 4 and/or the UE 505 in FIG. 5. Additionally, the process may be performed by the network 520 of the TPs 510 and 515 indicating the QCL behavior to the UE.

The process begins by determining whether the UE is configured in TM10 and whether QCL type B is configured (step 705). For example, in step 705, the process is applicable to a UE being configured in TM10 for a serving cell in long term evolution (LTE) wireless communication system (e.g., a Release 11 UE). The process may also be applicable when DCI format 1A is used and QCL type B behavior has been configured by higher layer signaling. If the UE is not configured in TM10 (e.g., configured in TM1-TM9), the UE may use QCL behavior 1 discussed below with regard to step 720.

If the UE is configured in TM10, the process determines whether a CRC for a PDSCH transmission scheduled by DCI format 1A is scrambled using a C-RNTI (step 710). If C-RNTI scrambling is used, the process determines whether a transmission scheme of the PDSCH transmission uses a non-MBSFN (or normal) subframe configuration and whether the PDSCH transmission is transmitted on antenna port 0 or a TxD scheme is used (step 715). If the non-MBSFN subframe configuration and antenna port 0 or TxD scheme are used, the process then determines for the UE to use QCL behavior 1 for PDSCH reception (step 720), with the process terminating thereafter. For example, in step 720, the UE may, for QCL behavior 1, assume that CRS and PDSCH are quasi co-located.

If, however, the non-MBSFN subframe configuration and antenna port 0 or TxD scheme not used, the process determines that the transmission scheme of the PDSCH transmission scheduled by DCI format 1A uses a MBSFN subframe configuration and the PDSCH transmission is transmitted on antenna port 7 (step 725). The process then determines for the UE to use QCL behavior 2 for PDSCH reception (step 730). For example, in step 730, the UE may, for QCL behavior 2, assume that CRS, CSI-RS, and DMRS are not quasi co-located with an exception that the UE assumes the PDSCH DMRS and a particular CSI-RS resource indicated by physical layer signaling to be quasi co-located (e.g., QCL type B).

Returning to step 710, if C-RNTI scrambling is not used, the process determines whether the CRC for the PDSCH transmission is scrambled using a SPS C-RNTI (step 735). If the CRC for the PDSCH transmission is scrambled using a SPS C-RNTI, the process determines for the UE to use QCL behavior 2 for PDSCH reception (step 730), with the process terminating thereafter.

Although FIG. 7 illustrates an example of a process for determining QCL behavior for a UE various changes may be made to FIG. 7. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining quasi co-location (QCL) behavior for a user equipment (UE), the method comprising:
when configured in transmission mode 10 (TM10) for a serving cell in long term evolution (LTE) wireless communication system, determining, by the UE, whether a cyclical redundancy check (CRC) for a physical downlink shared channel (PDSCH) transmission is scrambled using a cell radio network temporary identifier (C-RNTI);
in response to determining that the CRC for the PDSCH transmission is scrambled using the C-RNTI, determining whether a transmission scheme of the PDSCH transmission uses a non-multicast broadcast single frequency network (non-MB SFN) subframe configuration and whether the PDSCH transmission is transmitted on antenna port 0 or a transmit diversity scheme is used; and
in response to determining the non-MBSFN subframe configuration and antenna port 0 or the transmit diversity scheme being used, determining to use QCL behavior 1 for PDSCH reception.

2. The method of claim 1, wherein, for QCL behavior 1, the UE is configured to assume that a cell specific reference signal (CRS) and PDSCH are quasi co-located.

3. The method of claim 2 further comprising:
when configured in TM10 and in response to determining that the CRC for the PDSCH transmission is scrambled using the C-RNTI, determining whether the transmission scheme of the PDSCH transmission uses a MBSFN subframe configuration and whether the PDSCH transmission is transmitted on antenna port 7; and
in response to determining the MBSFN subframe configuration and antenna port 7 being used, determining to use QCL behavior 2 for PDSCH reception.

4. The method of claim 3, wherein, for QCL behavior 2, the UE is configured to assume that the CRS, a channel state information reference signal (CSI-RS), and a demodulation reference signal (DMRS) are not quasi co-located with an exception that the UE is configured to assume a PDSCH DMRS and a particular CSI-RS resource indicated by physical layer signaling to be quasi co-located.

5. The method of claim 2 further comprising:
when configured in TM10, determining whether the CRC for the PDSCH transmission is scrambled using a semi-persistent scheduling (SPS) C-RNTI; and
in response to determining that the CRC for the PDSCH transmission is scrambled using the SPS C-RNTI, determining to use QCL behavior 2 for PDSCH reception.

6. The method of claim 5, wherein, for QCL behavior 2, the UE is configured to assume that the CRS, a channel state information reference signal (CSI-RS), and a demodulation reference signal (DMRS) are not quasi co-located with an exception that the UE is configured to assume a PDSCH DMRS and a particular CSI-RS resource indicated by physical layer signaling to be quasi co-located.

7. The method of claim 5, wherein determining whether the CRC for the PDSCH transmission is scrambled using C-RNTI or SPS C-RNTI is performed in response to dynamic control information (DCI) format 1A and QCL type B being configured.

8. An apparatus in a user equipment (UE) capable of determining quasi co-location (QCL) behavior for the UE, the apparatus comprising:
a receiver configured to receive a physical downlink shared channel (PDSCH) transmission; and
a controller configured to:
determine, when configured in transmission mode 10 (TM10) for a serving cell in long term evolution (LTE) wireless communication system, whether a cyclical redundancy check (CRC) for the PDSCH transmission is scrambled using a cell radio network temporary identifier (C-RNTI);
determine, in response to determining that the CRC for the PDSCH transmission is scrambled using the C-RNTI, whether a transmission scheme of the PDSCH transmission uses a non-multicast broadcast single frequency network (non-MBSFN) subframe configuration and whether the PDSCH transmission is transmitted on antenna port 0 or a transmit diversity scheme is used; and determine, in response to determining the non-MBSFN subframe configuration and antenna port 0 or the transmit diversity scheme being used, to use QCL behavior 1 for PDSCH reception.

9. The apparatus of claim 8, wherein, for QCL behavior 1, the UE is configured to assume that a cell specific reference signal (CRS) and PDSCH are quasi co-located.

10. The apparatus of claim 9, wherein the controller is further configured to:
   determine, when configured in TM10 and in response to determining that the CRC for the PDSCH transmission is scrambled using the C-RNTI, whether the transmission scheme of the PDSCH transmission uses a MBSFN subframe configuration and whether the PDSCH transmission is transmitted on antenna port 7; and
   determine, in response to determining the MBSFN subframe configuration and antenna port 7 being used, to use QCL behavior 2 for PDSCH reception.

11. The apparatus of claim 10, wherein, for QCL behavior 2, the UE is configured to assume that the CRS, a channel state information reference signal (CSI-RS), and a demodulation reference signal (DMRS) are not quasi co-located with an exception that the UE is configured to assume a PDSCH DMRS and a particular CSI-RS resource indicated by physical layer signaling to be quasi co-located.

12. The apparatus of claim 9, wherein the controller is further configured to:
   determine, when configured in TM10, whether the CRC for the PDSCH transmission is scrambled using a semi-persistent scheduling (SPS) C-RNTI; and
   determine, in response to determining that the CRC for the PDSCH transmission is scrambled using the SPS C-RNTI, to use QCL behavior 2 for PDSCH reception.

13. The apparatus of claim 12, wherein, for QCL behavior 2, the UE is configured to assume that the CRS, a channel state information reference signal (CSI-RS), and a demodulation reference signal (DMRS) are not quasi co-located with an exception that the UE is configured to assume a PDSCH DMRS and a particular CSI-RS resource indicated by physical layer signaling to be quasi co-located.

14. The apparatus of claim 12, wherein the controller is further configured to determine whether the CRC for the PDSCH transmission is scrambled using C-RNTI or SPS C-RNTI is performed in response to dynamic control information (DCI) format 1A and QCL type B being configured.

15. An apparatus in a transmission point capable of indicating quasi co-location (QCL) behavior to a user equipment (UE), the apparatus comprising:
   a transmitter configured to transmit a physical downlink shared channel (PDSCH) transmission,
   wherein the transmission point is configured to indicate for UE to use QCL behavior 1 for PDSCH reception when the UE is configured in transmission mode 10 (TM10), a cyclical redundancy check (CRC) for the PDSCH transmission is scrambled using a cell radio network temporary identifier (C-RNTI), a transmission scheme of the PDSCH transmission uses a non-multicast broadcast single frequency network (non-MBSFN) subframe configuration, and the PDSCH transmission is transmitted on antenna port 0 or a transmit diversity scheme is used.

16. The apparatus of claim 15, wherein, for QCL behavior 1, the UE is configured to assume that a cell specific reference signal (CRS) and PDSCH are quasi co-located.

17. The apparatus of claim 16, wherein the transmission point is configured to indicate for the UE to use QCL behavior 2 for PDSCH reception when the UE is configured in TM10, the transmission scheme of the PDSCH transmission uses a MBSFN subframe configuration, and the PDSCH transmission is transmitted on antenna port 7.

18. The apparatus of claim 17, wherein, for QCL behavior 2, the UE is configured to assume that the CRS, a channel state information reference signal (CSI-RS), and a demodulation reference signal (DMRS) are not quasi co-located with an exception that the UE is configured to assume a PDSCH DMRS and a particular CSI-RS resource indicated by physical layer signaling to be quasi co-located.

19. The apparatus of claim 16, wherein:
   the transmission point is configured to indicate for the UE to use QCL behavior 2 when the UE is configured in TM10, and the CRC for the PDSCH transmission is scrambled using a semi-persistent scheduling (SPS) C-RNTI, and
   for QCL behavior 2, the UE is configured to assume that the CRS, the CSI-RS, and the DMRS are not quasi co-located with an exception that the UE is configured to assume a PDSCH DMRS and a particular CSI-RS resource indicated by physical layer signaling to be quasi co-located.

20. The apparatus of claim 19, wherein the transmitter is configured to transmit the PDSCH transmission when dynamic control information (DCI) format 1A and QCL type B are configured.

* * * * *